(12) United States Patent
Weber

(10) Patent No.: US 7,703,426 B2
(45) Date of Patent: Apr. 27, 2010

(54) HYDRAULIC CAMSHAFT ADJUSTER

(75) Inventor: Jurgen Weber, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/670,458

(22) Filed: Feb. 2, 2007

(65) Prior Publication Data
US 2007/0245991 A1    Oct. 25, 2007

(30) Foreign Application Priority Data
Feb. 2, 2006    (DE)    .................. 10 2006 004 760

(51) Int. Cl.
*F01L 1/34*    (2006.01)
(52) U.S. Cl. ............... 123/90.17; 123/90.15; 123/90.31
(58) Field of Classification Search .............. 123/90.15, 123/90.17, 90.31
See application file for complete search history.

(56) References Cited

U.S. PATENT DOCUMENTS

| | | | |
|---|---|---|---|
| 6,311,654 B1 | 11/2001 | Ushida et al. | |
| 6,450,137 B2 | 9/2002 | Ogawa | |
| 6,450,138 B1 * | 9/2002 | Kinugawa et al. | 123/90.17 |
| 2002/0100445 A1 * | 8/2002 | Takenaka et al. | 123/90.17 |
| 2006/0060161 A1 * | 3/2006 | Watanabe et al. | 123/90.17 |

FOREIGN PATENT DOCUMENTS

| | | |
|---|---|---|
| DE | 4032586 | 4/1991 |
| DE | 19623818 | 12/1996 |
| DE | 69028063 | 12/1996 |
| DE | 19918910 | 11/1999 |
| DE | 10127168 | 2/2002 |
| DE | 10253496.9 | 9/2003 |

* cited by examiner

*Primary Examiner*—Zelalem Eshete
(74) *Attorney, Agent, or Firm*—Volpe and Koenig, P.C.

(57) ABSTRACT

A camshaft adjuster for an internal combustion engine with a locking element is provided. For adjusting the camshaft adjuster (1) in the direction of a locking position, for example, when the internal combustion engine is switched off or when the hydraulic pressure drops, a mechanical spring element (23) is located between the rotor (5) and stator (3). The mechanical spring element (23) is arranged in a pressure chamber (12; 13). In this way, the installation space already existing for the pressure chambers (12; 13) can have a multifunctional use.

2 Claims, 6 Drawing Sheets

HYDRAULIC CAMSHAFT ADJUSTER

CROSS-REFERENCE TO RELATED APPLICATIONS

This application claims priority from DE 10 2006 004760.5, filed Feb. 2, 2006, which is incorporated by reference herein as if fully set forth.

BACKGROUND

The invention relates to a hydraulic camshaft adjuster for an internal combustion engine with a mechanical spring element, and in particular to a camshaft adjuster having a stator and a rotor, with two pressure chambers formed between the stator and the rotor which are separated by a vane of the rotor.

Hydraulic camshaft adjusters, especially in a rotary vane or vane-cell construction, typically have a stator and a rotor mounted with a degree of rotational freedom relative to the stator. Between the stator and the rotor there are at least two pressure chambers, which act in opposite directions and which are separated from each other by a radially oriented vane of the rotor.

It has been shown that the operation of a hydraulic camshaft adjuster is not problematic especially when the internal combustion engine provides sufficient hydraulic pressure, so that the pressure chambers are filled sufficiently with the hydraulic medium. However, it has also been shown that when the internal combustion engine starts up, under some circumstances sufficient pressure of the hydraulic medium cannot be provided. This has the result that when the internal combustion engine starts up in this way, the control times do not correspond to the default positions, or an unstable position of the camshaft adjuster is set, which produces "unstable" control times. Furthermore, it can generate undesired vibrations, which can lead to undesired noise in addition to increased component wear.

For preventing such problems, mechanical locking devices are known. From DE 196 23 818 A1, a locking device is known with a locking element constructed as a locking pin, whose front-end region has a conical construction and is held without backlash in a bore, which has a conical longitudinal section or an elliptical cross section, in a cover of the camshaft adjuster in a locked position. The locking pin is spring loaded and has two hydraulic control surfaces, of which the first, end control surface is in hydraulic connection with a pressure chamber of the camshaft adjuster and a second control surface formed by a shoulder of the locking pin is in hydraulic connection with another pressure chamber acting in the opposite direction in the camshaft adjuster.

From DE 101 27 168 A1, a locking device is known, in which a locking pin interacts with a step-shaped locking groove, wherein different levels of the step-shaped locking groove correspond to different locking positions, for example, a farthest advanced angle, an intermediate position, and a farthest retarded angle.

From DE 102 53 496, a locking device is known, in which a first locking pin assumes a locked position between an end position ADVANCED and a middle position, while a second locking pin can assume a locked position between an end position RETARDED and the middle position. When the pressure of the hydraulic medium falls to zero, the first locking pin can be brought into the locked position, while the second locking pin further remains in the unlocked position. When the internal combustion engine starts up, the inner rotor is moved by a dragging moment of the camshaft towards RETARDED until the first locking pin reaches the middle position. At this point, the second locking pin also reaches the locked position. After a successful engine start, the regulator increases the pressure of the lubricant in a first lubricant line, a first pressure chamber, and in the region of the first locking pin. Therefore, the first locking pin is unlocked, while the second locking pin is held in pressure contact with the second middle stop. For transitioning to regulated operation, the regulator increases the pressure in the second pressure chamber, whereby the second locking pin is also unlocked, so that the inner rotor can move freely. A corresponding locking device is also known from U.S. Pat. No. 6,450,137 B2.

From DE 199 18 910 A1, a locking device is known, which has two locking pins that can be activated in the radial control direction.

From the unpublished patent application of the applicant with the internal filing number of the applicant E 2004 255 and the title "Locking device for a Camshaft Adjuster of an Internal Combustion Engine," it is known to lock the camshaft adjuster in a single position, especially the end position, with two locking pins, which have different amounts of peripheral backlash and which are acted upon by different pressure chambers of the camshaft adjuster.

Furthermore, from the unpublished patent application of the applicant with the internal filing number of the applicant E 2005 161 and the title "Camshaft Adjuster with a Locking Device," it is known to provide a locking element both in an end position ADVANCED and also in the region of an end position RETARDED and to provide, in particular, a third locking element in a middle position.

From the unpublished patent application of the applicant with the internal filing number of the applicant A 2004 03 and the title "Locking Device for a Camshaft Adjuster," a hydraulic actuation of a locking element is known, in which reliable measures for preventing undesired actuation of the locking element are taken.

The previously explained hydraulic camshaft adjusters and the locking devices are based on the requirement that, in an operating situation, in which locking is desired (in the following "locking situation"), care must be taken that the rotational angle of the rotor relative to the stator is located in a desired range or at a defined rotational angle. Here, the angle can involve, in particular, the rotational angle correlating to the locking position or a rotational angle between the end position ADVANCED and the locking position. Also possible are rotational angle ranges, for which it is guaranteed that the locking position is reached automatically when the internal combustion engine is turned off or when the internal combustion engine is restarted.

For guaranteeing that the rotor is located in a previously defined range for a locking situation, various measures are known:

According to E 2005 161, a spring element can be used, which applies a force on the rotor in the direction of the desired rotational angle range or the rotational angle coinciding with the locking position. Such a spring element, however, requires additional installation space.

From the unpublished patent application of the applicant with the internal filing number of the applicant E 2004 332 and the title "Method for Operating a Hydraulic Camshaft Adjuster," it is known to use a shutdown predictor, which indicates that locking of the camshaft adjuster is likely or required, for example, because the internal combustion engine is set for operation in the future. For the case that the shutdown predictor indicates that the locking is required, a force is applied to the camshaft adjuster automatically via a control unit, such that a) the camshaft adjuster moves in the direction of the locking position or b) it moves into a rotational angle lying between the locking position and an end position ADVANCED.

On the other hand, it has been shown that influencing the force relationships in a camshaft adjuster via a spring element can also be desirable independent of any end position locking:

U.S. Pat. No. 6,311,654 B1 addresses the problem that a hydraulic pump for charging the pressure chambers is typically driven by a crankshaft, which has the result that the flow of hydraulic means is reduced, under some circumstances, at a low rotational speed of the internal combustion engine. This can lead to an undesired adjustment of the camshaft adjuster.

For overcoming problems of the previously explained type, JP A 9 264 110 proposes to connect a torsion spring between a driving element and a driven element. For this purpose, the torsion spring is supported in the housing of the camshaft adjuster with one foot on the chain wheel, while the other foot of the torsion spring is supported on the rotor.

This solution is considered problematic according to U.S. Pat. No. 6,311,654 B1 because, under some circumstances, a bypass between the pressure chambers of the camshaft adjuster can be created via the receptacle for the torsion spring, which can lead to undesired operating states up to breakdown of the camshaft adjuster. For preventing such problems, U.S. Pat. No. 6,311,654 B1 proposes to arrange the pressure chambers and the vanes radially outside of the receptacle for the torsion spring element, so that in a radial intermediate space in the housing, a suitable seal can be realized. In this way, however, the total radial installation size of the camshaft adjuster is increased. Such enlarged radial dimensions can be prevented according to U.S. Pat. No. 6,311,654 B1 in that the pressure chambers on one hand and the receptacle for the torsion springs on the other hand are arranged axially one next to the other with radially overlapping extensions. Transferring the hydraulic medium between individual pressure chambers via the receptacle for the spring element is prevented by a circular ring-shaped separating disk, which is connected axially between the pressure chambers and the receptacle.

From DE 40 32 586 A1, a camshaft adjuster is known, which is actuated by a control piston and in which a torsion spring arrangement is arranged parallel to the adjustment chambers between a driving wheel and a camshaft. This torsion spring arrangement is used for transmitting an approximately average torque. This construction is based on the knowledge that for adjustments in different directions, torques must be generated in the camshaft adjuster, which have opposing directions, whose magnitudes, however, are different for different directions, under some circumstances, so that, for example, through the movement of the drive and/or the frictional relationships, an average moment for the torque requirements for different adjustment directions can be produced, which is not equal to zero. To limit the moment to be generated in the camshaft adjuster to the difference of the required extremes from the average moment—and not to the, under some circumstances, greater absolute extreme—the publication proposes to supply the average moment via an energy accumulator, which is constructed as a torsion-spring arrangement connected parallel to the adjustment chambers between the driving wheel and the camshaft. The torsion-spring arrangement is constructed separately from the camshaft adjuster.

DE 690 28 063 T2 discloses another construction of using torsion-spring elements for influencing the moment relationships for a camshaft adjuster.

SUMMARY

The present invention is based on the objective of providing a hydraulic camshaft adjuster, in which, under consideration of the installation space requirements and with simple measures, the moment relationships can be influenced through the use of a spring element.

In particular, the invention is based on the objective of guaranteeing a camshaft adjuster with a locking element, such that the rotor is located in a locking situation in a rotational angle range or at a rotational angle, which is suitable for locking or future locking, for example, when the engine is started.

This objective is met by the features of the present invention. Additional constructions of the invention with further advantages are also provided.

According to the invention, a mechanical spring element is used. Such a mechanical spring element can involve any spring element, especially a spring element made from a spring steel, a compression and/or tension spring, a spiral spring, a spring made from a composite material, an elastomer spring element, a spring element with integrated damping element, a linear or non-linear spring, a spring formed with steel or another material with low internal friction, a helical, torsion, leaf, plate, ring spring, a worm spring, a roll spring, a sleeve spring, a slotted spring, a wound spring with cylindrical or conical winding or flat winding, a torsion spring with a rotational rod or rotational tube, a leaf spring, a plate spring, a deep-drawn disk spring, a ring spring, a spring made from plastic or rubber with or without gas or liquid filling, a rubber-metal composite spring, a spring made from fiber-reinforced plastic, a spring with hollow spaces or openings, projections, stop, ribs, indentations on at least one surface, a spring with an elastic material between a rigid outer sleeve and a rigid inner sleeve or a rigid inner bolt, a spring unit made from several individual spring elements of the same or different materials and/or construction, a liquid spring. Similarly possible is the combination of several equal or different springs of the previously mentioned types in mechanical series or parallel connections to form one spring element.

According to the invention, it is now known that it is not necessary that the mechanical spring element requires additional installation space and/or additional add-on elements or attachment points to existing components, such as stators and rotors.

Instead, the invention provides that mechanical spring elements are to be arranged within the pressure chamber. The pressure chambers are already existing installation spaces, which are used for adjusting the rotational angle between the rotor and stator and/or maintaining the rotational angle. According to the invention, the pressure chambers can thus have a multifunctional use.

Furthermore, it can be beneficial according to the invention that the pressure chambers are arranged radially spaced apart from the rotational axis of the rotor relative to the stator. Forces generated in the spring element can thus be converted into an adjustment moment with the lever arm, which is defined by the distance of the pressure spaces from the previously mentioned rotational axis.

According to the invention it is now also known that, especially for the construction of the hydraulic relationships in the pressure chambers, it is not disadvantageous to arrange an additional body in the form of the mechanical spring element in the pressure chamber. Under some circumstances, through the arrangement of the additional body, the amount of hydraulic medium, which is required in the pressure chamber, can be reduced. Furthermore, for a suitable construction of the mechanical spring element, a dynamic response for moving the hydraulic medium in the pressure chambers into and out of these chambers can be suitably influenced.

As another advantage of the construction of the invention, it should be mentioned that for the arrangement of the mechanical spring element in the pressure chamber, the forces applied by the spring element in the locking situation act on the rotor and stator at the same position as the forces generated by the hydraulic medium in the pressure chambers, so that long force transmission paths are not produced, which could have negative effects due to finite stiffness. Furthermore, it can be advantageous when the mechanical spring element is surrounded and protected by the hydraulic medium, whereby, for example, frictional contact positions of the spring element with the surroundings can be lubricated.

According to another feature of the invention, the mechanical spring element is used to apply a force to the rotor in the direction of a position that is advantageous for locking, especially into a rotational angle range that is advantageous for locking or directly into the rotational angle that corresponds to the locking position. Thus, the mechanical spring element has the effect that with a pressure drop in at least one pressure chamber, the spring element can contribute to moving the rotor into a position that is advantageous for the locking situation.

For another construction of the camshaft adjuster according to the invention, the rotational angle of the rotor is limited relative to the stator, such that the mechanical spring element moves into a blocking (fully compressed) form. In this way, additional stops or stop surfaces of the rotor and the stator can be eliminated or used at a farther position. Redundant limiting possibilities of the rotational angle are also possible, on one side, by the mechanical spring element moving into a blocking form and, on the other side, by additional stops or the like.

In an alternative construction of the invention, between the rotor and the stator, a stop is provided, which limits a rotational angle of the rotor relative to the stator before the mechanical spring element moves into a blocking form. This is especially advantageous when the blocking of the mechanical spring element represents an additional mechanical loading of the spring element and/or the blocked position of the spring element is no longer reached with a defined height of the spring element.

An especially efficient use of the installation space is provided when a side surface of the rotor and/or the stator limiting the pressure chamber has a recess, groove, or bore, at whose base the mechanical spring element is supported. Thus, a part of the spring element can be arranged in the recess, groove, or bore, so that the spring element can be integrated in the pressure chamber also for a relatively smaller extent of the pressure chamber in the peripheral direction of the camshaft adjuster and/or for a relatively large extent of the spring element in the peripheral direction. In addition, it is possible that the lateral limits of the recess, the groove, or the bore are used as guides for the spring element, for example, for preventing kinking.

For a special construction of the camshaft adjuster according to the invention

The depth of the recess, groove, or bore of a wall of the rotor or stator or the common depth of a recess, groove, or bore of a wall of the rotor, as well as a wall of the stator is greater than the minimum height of the mechanical spring element. This means that for the case that the camshaft adjuster reaches an end position, the spring element does not have to assume the minimum height in the recess, groove, or bore, in particular, it does not have to move into a blocking form. In this way, it is also enabled, for example, that a pressure chamber for reaching the end position is almost completely emptied, such that a vane of the rotor forms a large-area contact on the vane of the stator oriented radially inside and is allocated to the end position.

According to a preferred construction of the camshaft adjuster, the spring element comprises a zigzag spring. Such a zigzag spring includes, in particular, at least one spring element in a closed ring structure or with spiral-shaped structure or zigzag-shaped structure or back-and-forth structure. Individual segments can have a wavy construction with curves or kinks, so that maxima and minima are formed that approximate elastic deformation. For example, individual minima and maxima can be supported at different sub-areas of the zigzag spring.

An example construction of the zigzag spring segment is to be taken from EP 1 477 701 A2, wherein, in one spring element, several such segments can be connected one behind the other. Through the use of a spring element constructed according to EP 1 477 701 A2, a non-linear behavior of the spring element can be set structurally. One spring segment with a definite progressive spring characteristic line for a zigzag spring can be taken from EP 1 586 788 A2. In JP 2002 242969 A, a zigzag spring is disclosed, through which wear of the spring feet and the appearance of offsetting forces can be minimized. JP 2002 276707 A shows a zigzag spring with non-linear stiffness behavior. A zigzag spring, in which lateral deflection and sliding is prevented, is to be taken from JP 2002 276708 A. JP 2002 307121 A shows an arrangement of several zigzag springs in a spring element connected mechanically one behind the other, wherein the individual zigzag springs can have different stiffness values and wavy shapes and/or different diameters. From U.S. Pat. No. 6,669,184 B2, a spring element is known, which is formed with individual, ring-shaped zigzag springs. Other structural shapes of spring elements as zigzag springs emerge, for example, from U.S. Pat. No. 6,758,465 B1, U.S. Pat. No. 6,408,631 B1, JP 2004 245313 A, JP 2004 225880 A, JP 2002 276706 A. All of the previously mentioned constructions of a zigzag spring can be used within the scope of the invention.

According to one improvement of the camshaft adjuster according to the invention, the longitudinal axis of the zigzag spring is (at least partially) curved in a peripheral direction. For the case that the pressure chamber, in which the zigzag spring is arranged, has a cylindrical limiting wall arranged radially on an inside and/or outside, a zigzag spring that is curved accordingly in the peripheral direction can lead to an especially effective use of the pressure chamber. Preferably, the radius of curvature of the longitudinal axis of the zigzag spring is constructed approximately according to the radius of the pressure chamber from the longitudinal axis of the camshaft adjuster, especially in the area between the radius of the inner surface of the pressure chamber and the outer surface of the pressure chamber.

In another construction of the invention, the minimum height of the mechanical spring element constructed as a zigzag spring is in the range from 0.1 mm to 1.0 mm when this spring element is compressed to a blocking form. In this way, the installation space required for the mechanical spring element can be minimized, especially in the peripheral direction. For the case that the mechanical spring element is arranged in a recess, groove, or bore, the depth of this recess, groove, or bore can be minimized.

The structure of the camshaft adjuster according to the invention with a spring element arranged in the pressure chamber can be used for a camshaft adjuster, which can be locked at any arbitrary rotational angle or at several arbitrary rotational angles, see also the state of the art explained above. For example, the spring element can act on the rotor, such that the rotor is moved in the direction of an end position, in which a locking element becomes active. In this case, it can be sufficient that only one side of the vane of the rotor is acted upon by one spring element.

On the other hand, the use of a spring element according to the invention can also be used in a pressure chamber when locking is to take place in a middle position. In this connection, not only is the exact center between the two end positions subsumed under the term middle position, but also any possible position between the two end positions, which can be used advantageously in a locking situation, for example, for restarting the internal combustion engine. Especially for the case of locking in the middle position, it can be advantageous when spring elements act on the vanes of the rotor on both sides. These spring elements generate spring forces acting in opposite directions on the rotor. These spring forces have the effect that the rotor is located in force equilibrium in the region of the middle position for a rotational angle of the rotor relative to the stator.

The present invention is not limited to using the spring element in the pressure chamber in connection with movement of the rotor in the direction of a locking position. Instead, at least one spring element can be used in at least one pressure chamber for arbitrary effects of the force relationships on the camshaft adjuster.

Advantageous improvements of the invention emerge from the claims, the description, and the drawings. The advantages of features and combinations of several features named in the introduction to the description are merely examples, without these necessarily having been derived from embodiments according to the invention. Other features are to be taken from the drawings—especially the illustrated geometries and the relative dimensions of several components relative to each other, as well as their relative arrangement and force connection. The combination of features of different embodiments of the invention or of features of different claims is also possible different from the selected interrelationships of the claims and is proposed herewith. This also relates to features shown in separate drawings or mentioned in their description. These features can also be combined with features of different claims. Likewise, features listed in the claims can be eliminated for other embodiments of the invention.

BRIEF DESCRIPTION OF THE DRAWINGS

Additional features of the invention emerge from the following description and the associated drawings, in which the presently preferred embodiments of the invention are shown schematically. Shown are.

DETAILED DESCRIPTION OF THE PREFERRED EMBODIMENTS

Figure 1:
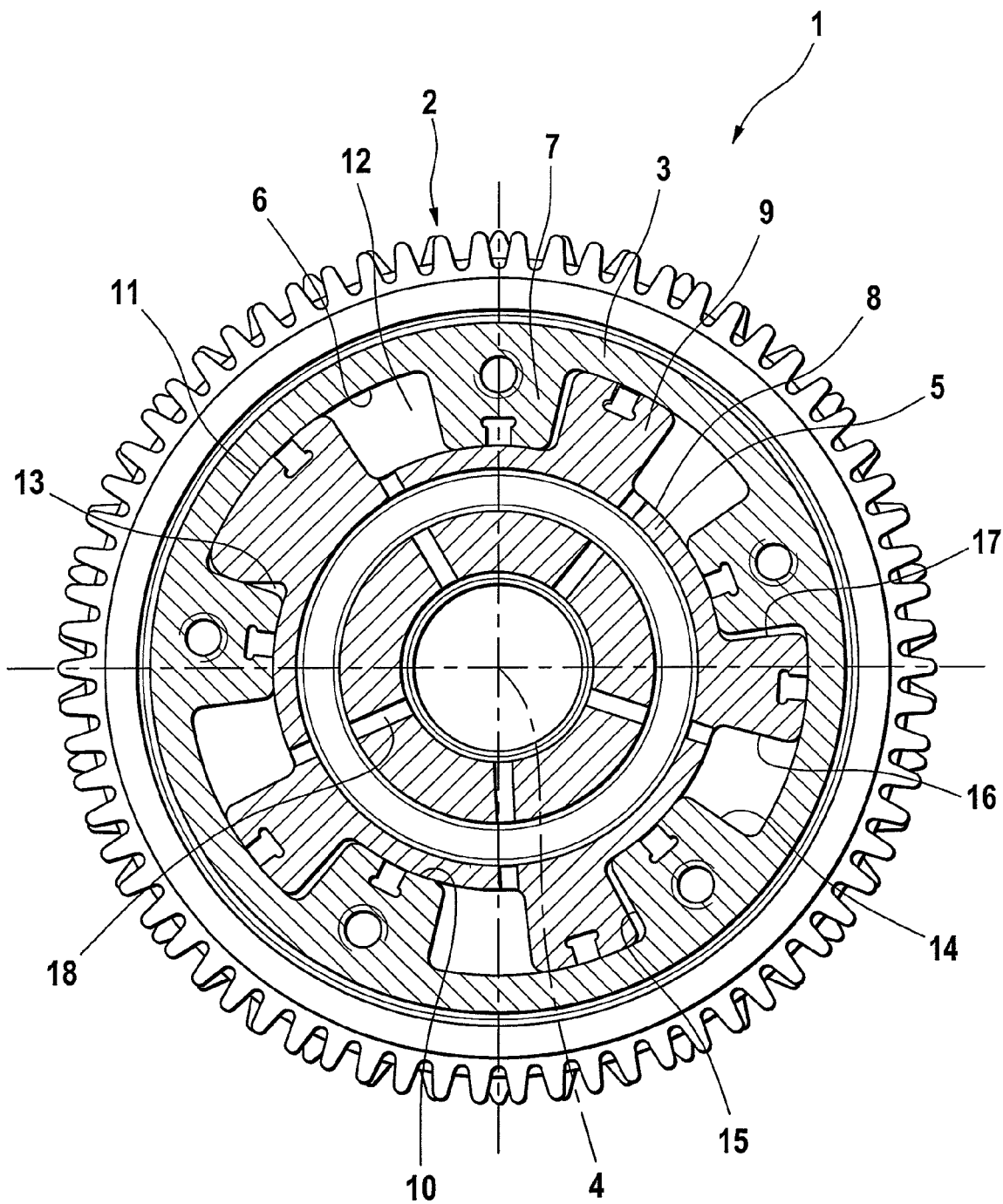
FIG. 1 is a cross-sectional view of a camshaft adjuster according to the state of the art.

In FIG. 1, a camshaft adjuster 1 is shown in a cross section. The shown camshaft adjuster 1 comprises an adjuster with a known vane-cell construction. Accordingly, the invention can be used for a camshaft adjuster in a rotary-vane construction.

The camshaft adjuster 1 has a driving wheel 2, which is driven by a crankshaft of the internal combustion engine via a suitable traction mechanism, especially a synchronous belt or a chain. The driving wheel 2 is locked in rotation with a stator 3, in which a rotor 5 is arranged, which can rotate relative to the stator about a longitudinal axis 4-4 and which is connected to a camshaft. The stator 3 has an internal cylindrical lateral surface 6, from which extend vanes 7 oriented radially inwardly and which are distributed uniformly over the periphery. The rotor 5 has a cylindrical outer lateral surface 8, from which extend vanes 9 radially outwardly and which are distributed uniformly over the periphery. The ends 10 of the vane 7 contact the lateral surface 8 of the rotor in a sliding and sealed way, while the ends 11 of the vane 9 of the rotor 5 contact the lateral surface 6 of the stator 3 in a sliding and sealed way. On opposite sides of the vane 9 there are pressure chambers 12, 13, with the pressure chambers 12, 13 being limited radially on the inside by the lateral surface 8 of the rotor 5, radially on the outside by the surface 6 of the stator 3, in a peripheral direction by a side surface 14 or 15 of a vane 7 of the stator 3, and also in the other peripheral direction from a side surface 16 or 17 of the vane 9 of the rotor 5. The pressure chambers 12, 13 are fed via hydraulic channels 18.

Figure 2:
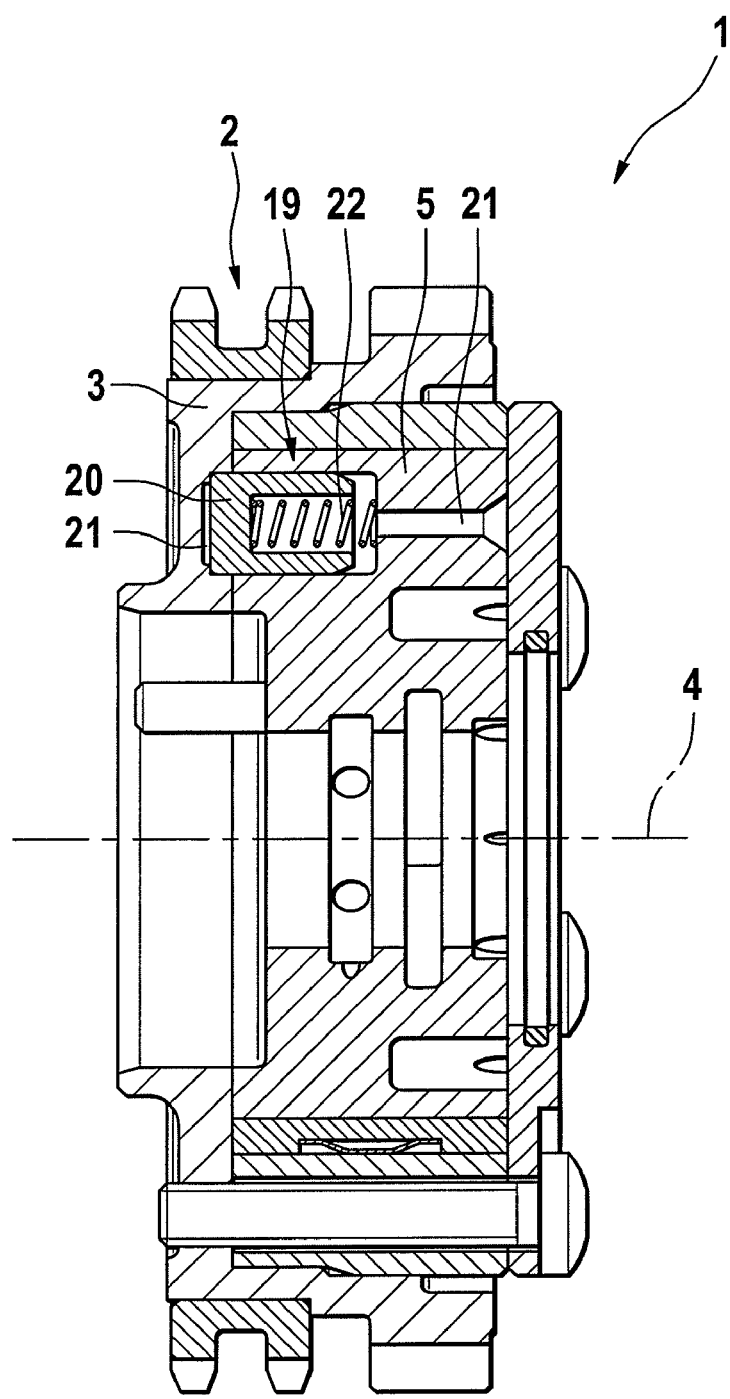
FIG. 2 is a longitudinal section view of the camshaft adjuster according to FIG. 1.

FIG. 2 shows a locking element 19, which has a locking pin 20, through which a positive-fit connection between the stator 3 and rotor 5 can be produced in a locking position. The locking pin 20 is charged with a hydraulic medium via a hydraulic channel 21 in the region of at least one end, wherein according to FIG. 2 a spring element 22 acting on the locking pin 20 can also be provided.

Figure 3:
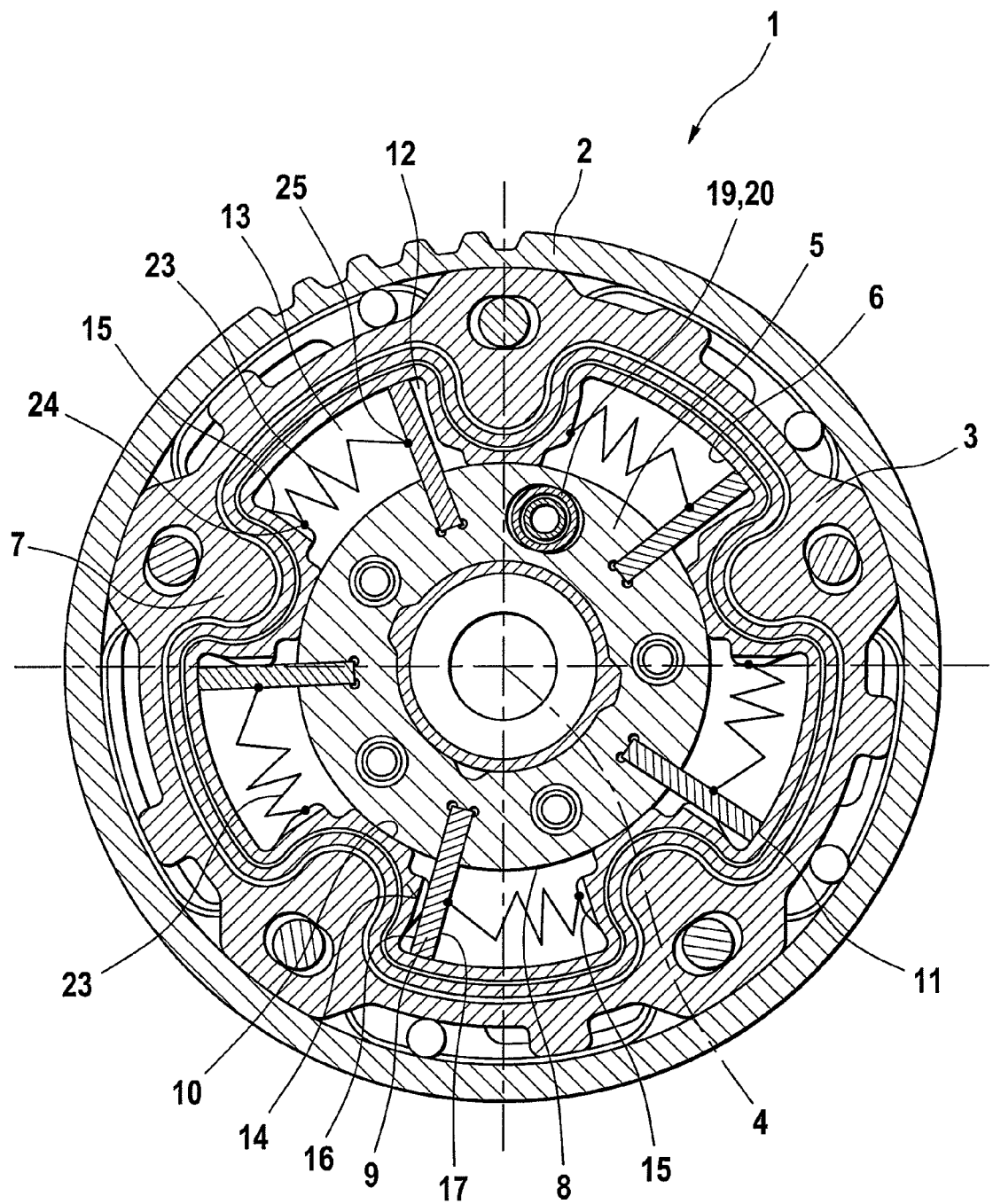
FIG. 3 is a cross-sectional view of a camshaft adjuster according to the invention for a vane-cell construction with a spring element arranged in a pressure chamber and end-position locking.

In FIG. 3 a camshaft adjuster 1 with a vane-cell construction is shown that is differentiated from FIGS. 1 and 2. Here, the same reference symbols as for the embodiment shown in FIGS. 1 and 2 are used for specifying the components according to their function. Furthermore, in FIG. 1 the camshaft adjuster 1 is shown for locking in an end position RETARDED, while the camshaft adjuster according to FIG. 3 is locked in an end position ADVANCED. A spring element 23 extending around the longitudinal axis 4-4 approximately in the peripheral direction is arranged in the pressure chamber 13. One spring foot 24 is supported on the side surface 15 of the vane 7, while the other foot 25 is supported on the side surface 17 of the vane 9.

For the embodiment shown in FIG. 3, five pairs of pressure chambers 12, 13 are provided each with five vanes 7, 9. A spring element 23 is arranged in each of the pressure chambers 13. The spring elements 23 are connected between the side surfaces 15, 17, such that these act in the direction of the end position for deflection from this end position ADVANCED shown in FIG. 3. In the shown end position, the spring elements 23 can be released from tension or biased, so that via the spring element 23, the vane 9 is pressed against the side surface 14 or a suitable stop in a region of the side surface 14.

Figures 4, 4A:
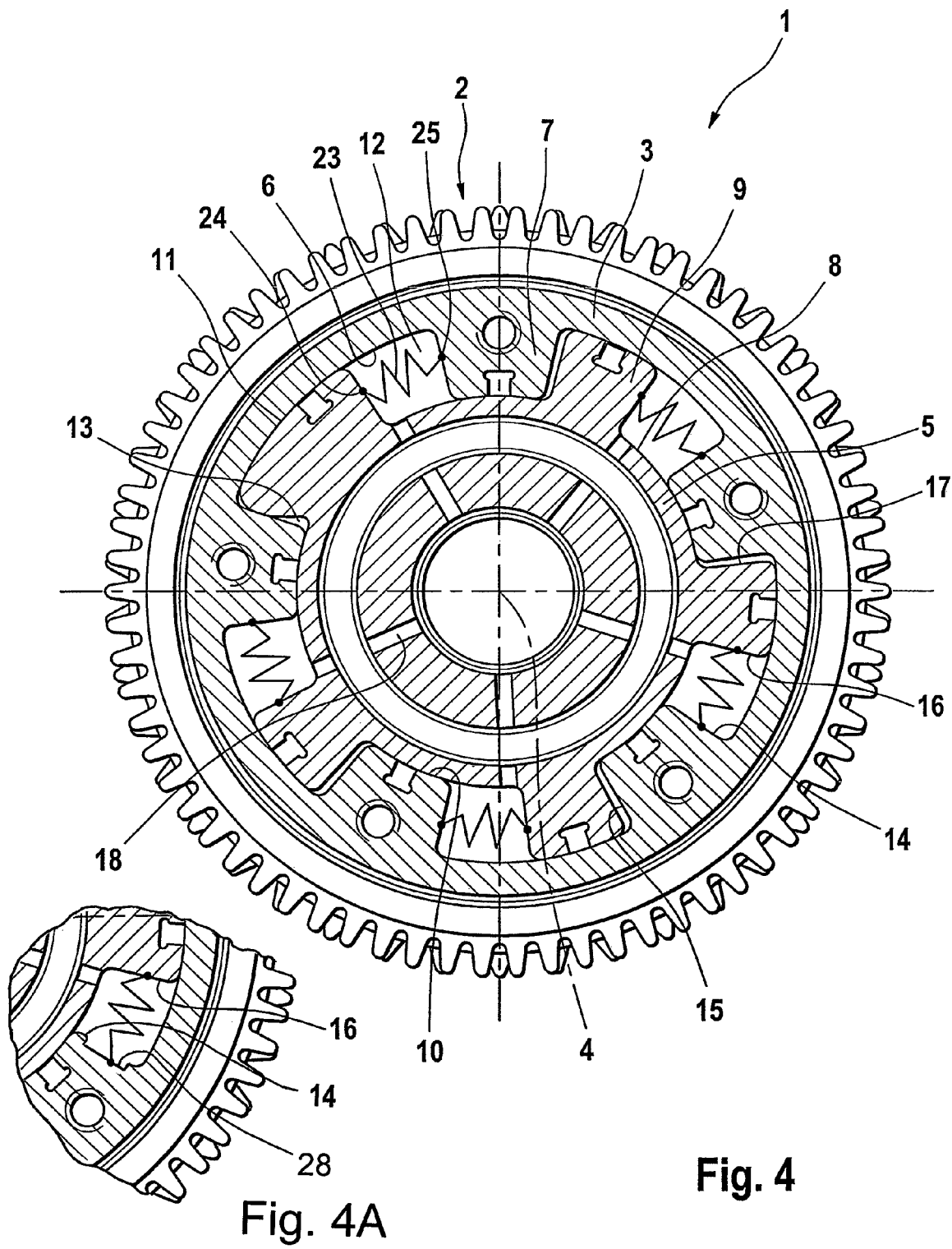
FIG. 4 is a cross-sectional view of another construction of a camshaft adjuster according to the invention for a rotary vane construction.
FIG. 4A is a partial cross-sectional view of a camshaft adjuster similar to FIG. 4, in which the spring element is arranged in a recess, groove, or bore that is greater than the minimum height of the spring element.

FIG. 4 shows a corresponding construction for use of the invention for a camshaft adjuster 1 in a rotary-vane construction. Furthermore, the camshaft adjuster shown in FIG. 4 is charged by the spring element 23 in a direction of an end position RETARDED, in which locking can take place, for example.

FIG. 4A shows a special construction of the camshaft adjuster according to the invention in which a recess, groove, or bore 28 is located in a wall of the stator 3 at the side surface of the vane 14 which has a depth that is greater than the minimum height of the spring element 23. This means that for the case that the camshaft adjuster reaches an end position, the spring element does not have to assume the minimum height in the recess, groove, or bore 28, in particular, it does not have to move into a blocking form, as the side surface of the vane 14 forms a stop to keep the spring from reaching the minimum height. In this way, it is also enabled, for example, that a pressure chamber for reaching the end position is almost completely emptied, such that a vane of the rotor forms a large-area contact on the vane of the stator oriented radially inside and is allocated to the end position.

Figure 5:
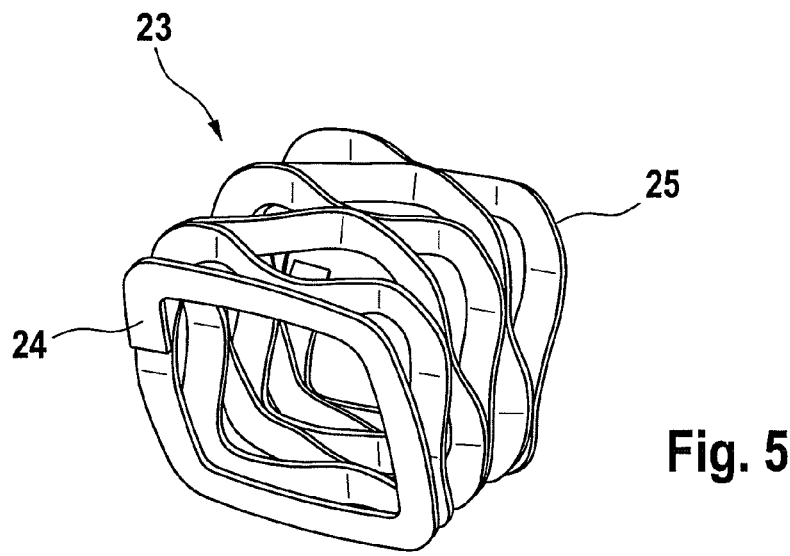
FIG. 5 is a perspective view of a spring element constructed as a zigzag spring.
Figure 6:
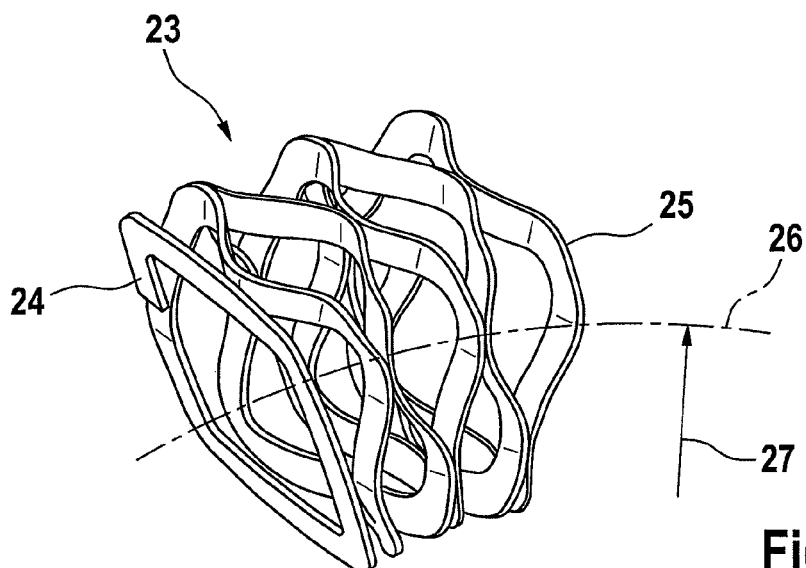
FIG. 6 is a perspective view of the spring element shown in FIG. 5 from a changed viewing direction.
Figure 7:
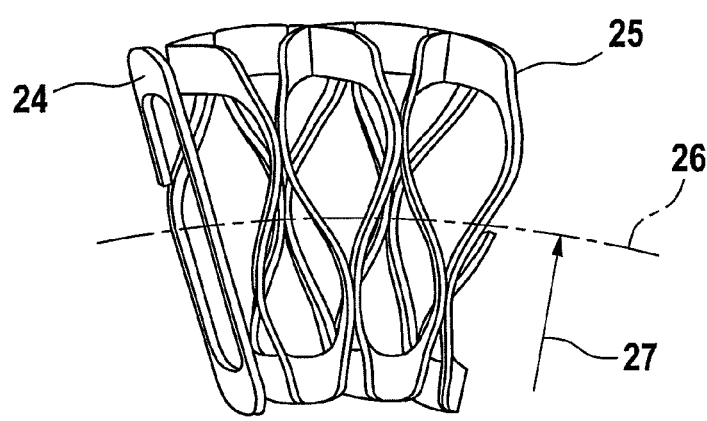
FIG. 7 is a side view of the spring element shown in FIGS. 5 and 6.

FIGS. 5 to 7 show a special construction for the spring element 23, namely as a zigzag spring. Preferably, a longitudinal axis 26-26 has a curved construction with a curvature of radius 27, which lies in the range between the radius of the lateral surface 6 of the stator 3 and the lateral surface 8 of the rotor 5 and approximately corresponds, in particular, to a middle of the previously mentioned radii.

Figure 8:
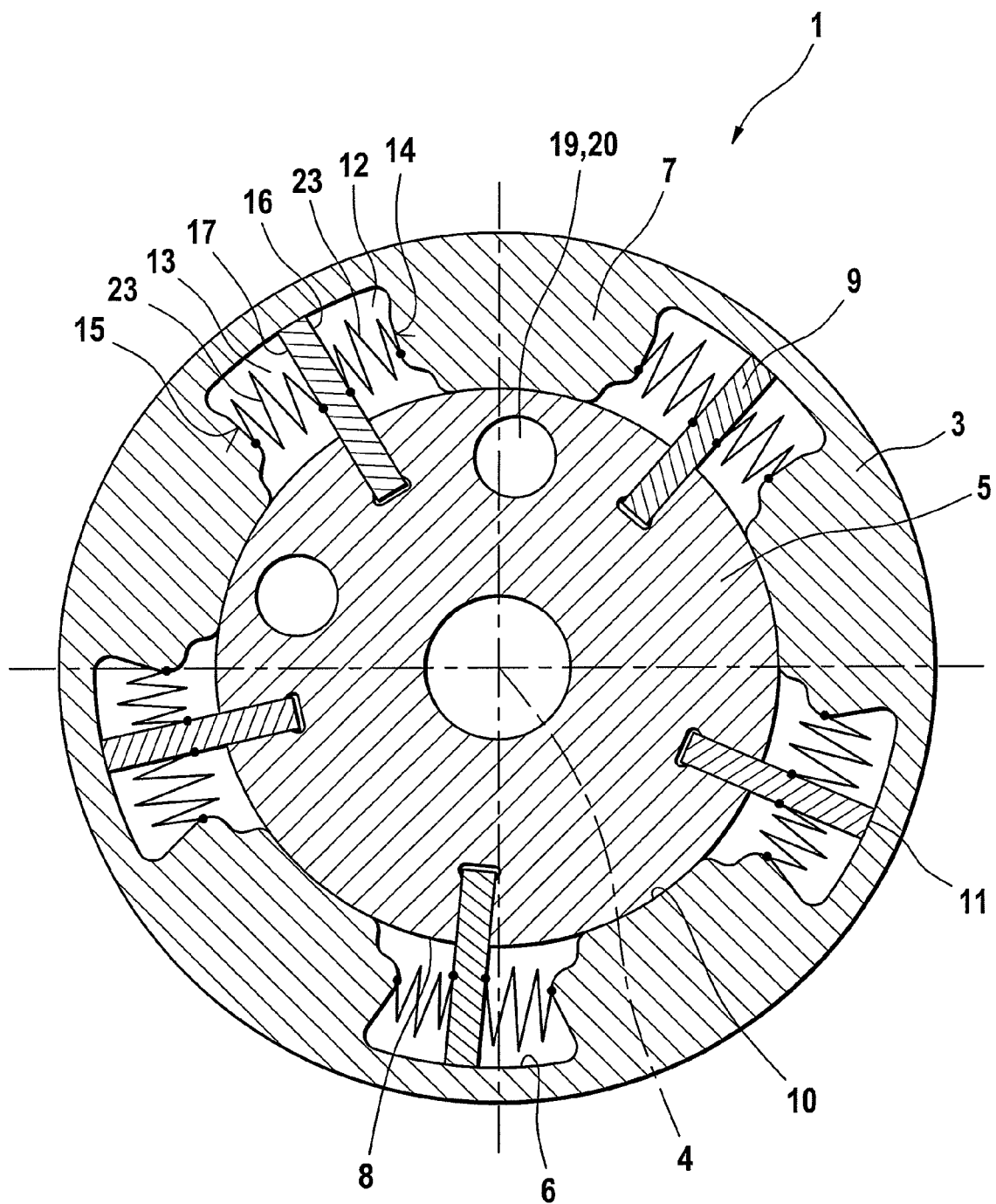
FIG. 8 is a cross-sectional view of another embodiment of a camshaft adjuster according to the invention for a vane-cell construction with middle locking.

FIG. 8 shows a camshaft adjuster 1 in vane-cell construction, in which locking takes place in the shown middle position. In this case, a spring element 23 is located both in the pressure chamber 12 and also in the pressure chamber 13, with the spring elements acting in opposite directions relative to each other. The spring element 23 arranged in the pressure chamber 13 is tensioned between the side surfaces 15 and 17, while the spring element 23 arranged in the pressure chamber 12 is tensioned between the side surfaces 14 and 16.

Through the construction according to the invention, in particular, a restoring function of the rotor 5 can be guaranteed, without additional axial installation space being required. Relative to solutions known from the state of the art, the weight of the camshaft adjuster 1 and also the production and assembly costs are reduced. The solution according to the invention represents a robust solution, which can be used universally. The spring element 23 can have a rectangular or round cross section or can be constructed as a telescoping spring. Different from the shown embodiments, the spring element 23 can be arranged only in a few of the pressure chambers 12, 13. Through the curved construction of the longitudinal axis 26 of the spring element 23, it can be guaranteed that the spring element forms no contact surfaces with the inner and outer lateral surfaces 8, 6 or can be guided by these surfaces. Furthermore, through the curved construction it can be guaranteed that the spring force of the spring element 23 acts on the vane 9 of the rotor 5 approximately perpendicular to the peripheral direction.

For the construction according to the invention, additional components, such as a spring cover, a spring receptacle, and also required seals, are eliminated. In this way, weight and cost reductions can be achieved. Assembly of the previously mentioned components is eliminated. The spring element 23 can be inserted into the pressure chambers 12, 13 for assembly in the axial direction.

LIST OF REFERENCE SYMBOLS

1 Camshaft adjuster
2 Driving wheel
3 Stator
4 Longitudinal axis
5 Rotor
6 Lateral surface of stator
7 Vane stator
8 Lateral surface of rotor
9 Vane rotor
10 End vane of stator
11 End vane of rotor
12 Pressure chamber
13 Pressure chamber
14 Side surface of stator vane
15 Side surface of stator vane
16 Side surface of rotor vane
17 Side surface of rotor vane
18 Hydraulic channel
19 Locking element
20 Locking pin
21 Hydraulic channel
22 Spring element
23 Spring element
24 Spring foot
25 Spring foot
26 Longitudinal axis
27 Radius of curvature
28 Recess, groove or bore

The invention claimed is:

1. Hydraulic camshaft adjuster for an internal combustion engine comprising:
   a) a stator,
   b) a rotor, which has a degree of rotational freedom relative to the stator,
   c) at least two pressure chambers, which are formed between the stator and rotor and which are separated from each other by a radially oriented vane of the rotor,
   d) a mechanical spring element, connected between the rotor and the stator, arranged in at least one of the at least two pressure chambers,
   e) a stop located between the rotor and the stator, which limits a rotational angle of the rotor relative to the stator, before the mechanical spring element moves into a blocking form, and
   f) a wall of the rotor and/or the stator which defines the pressure chamber has a recess, groove, or bore, with a base thereof on which the mechanical spring element (23) is supported, and a depth of the recess, groove, or bore or a common depth of two of the recesses, grooves, or bores in the pressure chamber is greater than a minimum height of the mechanical spring element.

2. Hydraulic camshaft adjuster for an internal combustion engine comprising:
   a) a stator,
   b) a rotor, which has a degree of rotational freedom relative to the stator,
   c) at least two opposing pressure chambers, which are formed between the stator and rotor and which are separated from each other by a radially oriented vane of the rotor, d) two mechanical spring elements, connected between the rotor and the stator, arranged in the at least two opposing pressure chambers, the two spring elements acting in different rotational directions of the rotor to urge the rotor in different directions,
e) a stop located between the rotor and the stator, which limits a rotational angle of the rotor relative to the stator, before the mechanical spring element moves into a blocking form, and
f) at least one wall of the rotor and/or the stator which define a respective one of each of the pressure chambers has a recess, groove, or bore, with a base thereof on which the mechanical spring elements are respectively supported, and a depth of the recess, groove, or bore or a common depth of two of the recesses, grooves, or bores within a respective one of the pressure chambers for each of the mechanical spring elements is greater than a minimum height of the mechanical spring elements, respectively.

\* \* \* \* \*